(12) United States Patent
Chomienne et al.

(10) Patent No.: US 12,145,204 B2
(45) Date of Patent: Nov. 19, 2024

(54) BROACHING TOOL, BROACHING MACHINE COMPRISING SUCH A TOOL AND METHOD FOR MACHINING A WORKPIECE USING SUCH A MACHINE

(71) Applicant: SAFRAN AIRCRAFT ENGINES, Paris (FR)

(72) Inventors: Vincent Chomienne, Moissy-Cramayel (FR); Mickael Rancic, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 302 days.

(21) Appl. No.: 17/600,326

(22) PCT Filed: Apr. 2, 2020

(86) PCT No.: PCT/FR2020/000081
§ 371 (c)(1),
(2) Date: Sep. 30, 2021

(87) PCT Pub. No.: WO2020/201641
PCT Pub. Date: Oct. 8, 2020

(65) Prior Publication Data
US 2022/0168827 A1 Jun. 2, 2022

(30) Foreign Application Priority Data

Apr. 3, 2019 (FR) ...................... 1903571

(51) Int. Cl.
*B23D 43/02* (2006.01)
*B23D 37/06* (2006.01)
*B23D 39/00* (2006.01)

(52) U.S. Cl.
CPC ............. *B23D 37/06* (2013.01); *B23D 39/00* (2013.01); *B23D 43/02* (2013.01)

(58) Field of Classification Search
CPC ........ B23D 43/02; B23D 43/04; B23D 43/00; B23D 37/22; B23D 37/02; B23D 41/04; B23C 5/28
See application file for complete search history.

(56) References Cited

U.S. PATENT DOCUMENTS 2,525,098 A * 10/1950 Hougland ............. B23F 21/268
407/14
3,641,642 A   2/1972 Schmidt
(Continued)

FOREIGN PATENT DOCUMENTS

JP   S491515 B1   1/1974
JP   S5145693 U   4/1976
JP   S598718 U    1/1984

OTHER PUBLICATIONS

English translation of Written Opinion mailed Jul. 30, 2020, issued in corresponding International Application No. PCT/FR2020/000081, filed Apr. 2, 2020, 6 pages.
(Continued)

*Primary Examiner* — Alan Snyder
(74) *Attorney, Agent, or Firm* — CHRISTENSEN O'CONNOR JOHNSON KINDNESS PLLC (57) ABSTRACT

A broaching tool includes at least one cutting zone with a cutting face that contacts a workpiece to remove material from the workpiece. At least one cavity corresponds to the cutting zone and is arranged to receive the removed material. A plurality of lubrication channels are supplied with lubricant, each lubrication channel having an inlet opening arranged to receive the lubricant and at least one outlet opening which opens into the cavity. The distance between the outlet openings of two consecutive lubrication channels varies further from the cutting face.

10 Claims, 4 Drawing Sheets

(56) References Cited

U.S. PATENT DOCUMENTS 5,820,320 A  10/1998 Kobari et al.
2018/0229314 A1* 8/2018 Lifka .................. C23C 4/02

OTHER PUBLICATIONS

International Preliminary Report on Patentability mailed Sep. 28, 2021, issued in corresponding International Application No. PCT/FR2020/000081, filed Apr. 2, 2020, 8 pages.
International Search Report mailed Jul. 30, 2020, issued in corresponding International Application No. PCT/FR2020/000081, filed Apr. 2, 2020, 7 pages.
Written Opinion mailed Jul. 30, 2020, issued in corresponding International Application No. PCT/FR2020/000081, filed Apr. 2, 2020, 7 pages.

* cited by examiner

BROACHING TOOL, BROACHING MACHINE COMPRISING SUCH A TOOL AND METHOD FOR MACHINING A WORKPIECE USING SUCH A MACHINE

FIELD OF THE DISCLOSURE

The disclosure relates to the field of broaching tools and machines, in particular for workpieces in the aircraft industry. The disclosure also relates to a method for broaching a workpiece using the broaching tool and machine.

BACKGROUND

In the aeronautical industry, certain metal workpieces are produced by means of a machining technique using chip removal, for example by broaching.

The prior art comprises in particular the documents JP-B1-S49 1515, JP-U-S51 45693, U.S. Pat. Nos. 3,641,642, 5,820,320, US-A1-2002/012573, JP-U-S59 8718 and JP-A-2015 066671.

The broaching is mainly used to obtain pockets, in particular shaped like a dovetail or shaped like a fir tree. In particular, the manufacturing of pockets, which are complex shapes, requires the use of a succession of broaches, each broach carrying out a removal of material from a particular area of the pocket. The broaching can also be used to obtain splines or complex and linear shapes.

Figure 1:
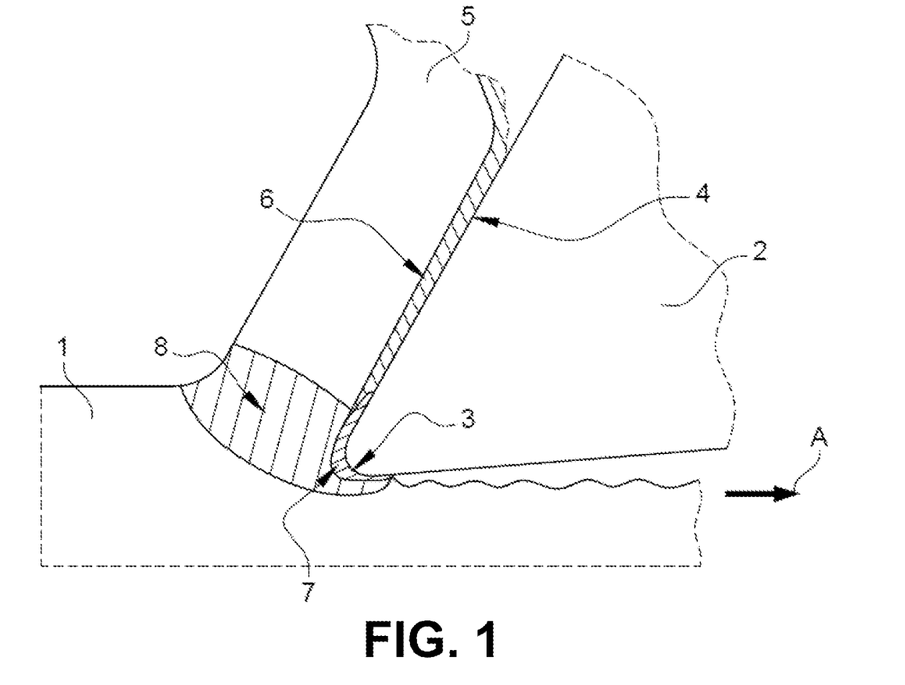
FIG. 1 is a cross-sectional view of the principle of the chip removal machining.

FIG. 1 illustrates the principle of chip removal machining, which is the removal, using a tool, of material from a raw workpiece, in the form of chips, so that the raw workpiece is given the desired shape and size. In this FIGURE, a metal workpiece 1 is machined by chip removal, by means of a tool 2 which comprises a nose 3 and an interface 4 which is in contact with a chip 5 which is intended to be removed from the workpiece 1.

The main physical phenomenon occurring during the conventional chip removal machining is an intense plastic deformation, i.e. an irreversible deformation, at the level of the nose 3 of the tool 2. This intense deformation is generated when the tool 2, which is hard, is brought into contact with the workpiece 1, which is softer than the tool 2, coupled with the realization of a relative movement between these two elements. For example, in FIG. 1, the arrow A illustrates the translation movement of the tool 2 relative to the workpiece 1.

At the level of the nose 3 of the tool 2, intense thermo-mechanical stresses are generated in the material of the workpiece 1 and on the tool 2, in particular in the areas 6 and 7 of intense thermomechanical stresses. The strong work hardening of the material and the resulting thermal effects, i.e. the phenomenon of thermal softening, will allow the workpiece to be sheared, in particular at the level of a shearing area 8, and thus create a chip 5. This chip 5, which comes from the workpiece 1, is then detached from the workpiece 1 and rubs intensely on the cutting face of the tool 2, i.e. on the tool-chip interface 4, which leads to a heat generation. Thus, high thermomechanical stresses are induced by the chip 5 on the tool 2, and vice versa.

The order of magnitude of the mechanical stresses at the tool-chip interface 4 and at the level of the nose 3 of the tool 2 is the giga Pascal and the temperatures that can be reached locally are of the order of 1000° C. for the aeronautical materials with low conductivity, such as titanium-based alloys and nickel-based alloys. If these thermomechanical stresses are too great, they can cause serious damage to the tool, such as chipping or tool breakage.

A conventional machining technique by chip removal using multiple edges is the broaching. The tool allowing to remove the material from the raw workpiece, called a broaching tool, consists of several elements, called broaches.

Figure 2:
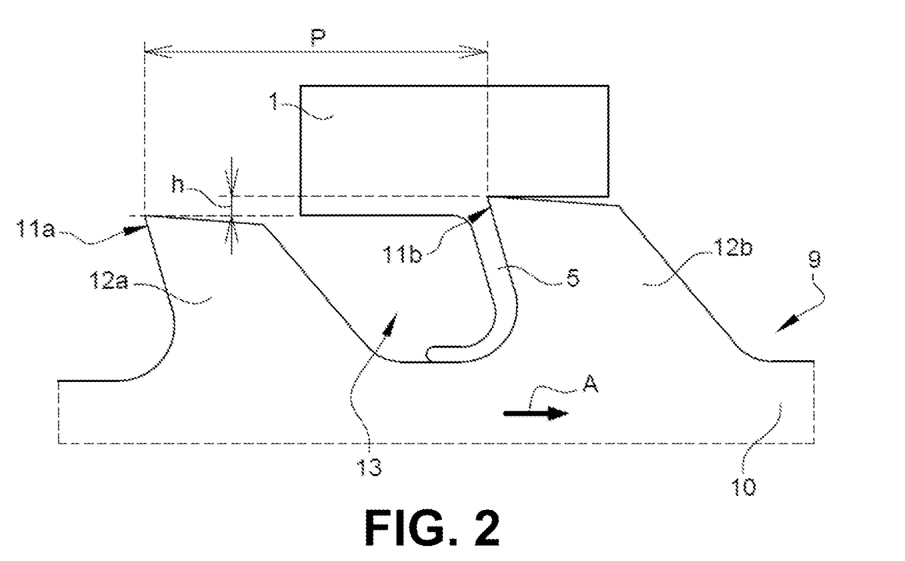
FIG. 2 is a cross-sectional view of the principle of a broaching operation.

FIG. 2 shows the principle of a broaching operation. In this FIGURE, a metal workpiece 1 is machined by means of a broaching tool 9.

Each broaching tool 9 comprises, on the same body 10, a succession of cutting faces 11a, 11b spaced apart from each other by a predetermined value P, called pitch, and staged by another predetermined value h, called the tooth progression, which corresponds, for each of the cutting faces 11a, 11b, to the quantity of material removed from the machined workpiece 1. Two successive broaches 12a, 12b are separated by a cavity 13, called chip chamber. The chip chamber 13 is the place where the chip 5 obtained is rolled up and lodged before it is ejected at the end of the material removal. The first broaches that meet the workpiece 1 to be machined by broaching, the so-called "straight roughing broaches", carry out the rough of the shape to be machined using straight cutting edges. Then, second broaches, called "shape roughing broaches", carry out the semi-finishing of the shape to be machined using cutting edges of any shape, allowing thus to approach the final profile of the shape to be machined. Finally, third broaches, known as "shape finishing", carry out the finish of the shape to be broached using any shape of cutting edges. In general, the tool 2 is fixed on a frame of a broaching machine and the workpiece 1 has a linear translation movement, represented by the arrow A.

The broaching operation can be carried out under lubrication. In general, the oil used for lubrication is a whole oil. The lubricant is only supplied from the outside of the broaching tool during broaching operations. Thus, when one or more teeth 12a, 12b are engaged in the machined workpiece 1, the lubricant can only with great difficulty, if at all, reach the cutting area, i.e. the contact area between the workpiece 1 and the tool 2. This leads to an increase in the cutting forces which can damage the tool, in particular by chipping or tool breakage, which is even more important with the increase in cutting speeds which lead to a rise in the temperature seen by the tool.

Also, in the case of a large tooth progression h, or when using a tool 2 carrying out a large part of the shape in finishing, for example a finishing element machining a complex shape, the formation of a chip 5 and its fragmentation is complex. This leads to the generation of very high forces and, consequently, to significant damage to the cutting edges 11a, 11b, in particular by chipping or tool breakage, which can have major impacts on the machined workpiece 1.

A first impact is a geometric impact. Indeed, the breakage, or the chipping, of a tooth means that this tooth cannot carry out the shape for which it was designed. The geometrical characteristics of the shape to be machined, such as splines or pockets, will not be respected.

The second impact is an impact on material integrity. Indeed, the incrustation of a tool break on the surface of a workpiece is a preferential site for the initiation of a fatigue crack, among others, leading to a significant reduction in the service life of the workpiece. The chipping of cutting edges induces material anomalies, the severity of which can also be detrimental to the service life of the workpiece.

In the field of aerospace industry, it is a good practice to visually check the teeth of each element of a broach after each broaching operation. The severe damage to a tooth on an element leads both to the purchase of a new element that is expensive and time-consuming to manufacture, and to the potential scrapping of the workpiece.

The purpose of the disclosure is to provide a solution that remedies at least some of these disadvantages.

In particular, the present disclosure provides a solution allowing to prevent these risks of damage to the broaching tool by supplying lubricant under high pressure as close as possible to the cutting area.

SUMMARY

To this end, the disclosure relates to a broaching tool, comprising:
- at least one cutting area comprising a cutting face which is intended to come into contact with a workpiece so as to remove material, in the shape of at least one chip, from the workpiece,
- at least one cavity corresponding to the cutting area, the cavity being arranged so as to receive the at least one chip,
- a plurality of lubrication channels intended to be supplied with lubricant, each lubrication channel having an inlet orifice arranged to receive the lubricant and at least one outlet orifice opening into the cavity, and characterized in that the distance between the outlet orifices of two consecutive lubrication channels of the plurality of lubrication channels varies by moving away from or closer to the cutting face.

Advantageously, the broaching tool according to the disclosure allows a lubrication at the level of the cutting area, which allows to prevent these risks of damage to the broaching tool.

In fact, the realization of internal lubrication channels in the broaching tool allows to deliver a liquid lubricant of any kind, for example whole oil or in the form of an emulsion, at the level of the cavity, which is called chip chamber.

More particularly, the cavity is equipped with one or more outlet orifices allowing the exit of the lubricant, directed so as to lubricate the cutting area and the cutting face in an optimal manner.

The broaching tool may comprise between one and thirty lubrication channels having an outlet orifice opening into a cavity.

The outlet orifices of the plurality of lubrication channels are distributed over the surface of the cavity.

In particular, the outlet orifices of the plurality of lubrication channels may be evenly distributed over the surface of the cavity. In other words, the distance between two consecutive outlet orifices of the plurality of lubrication channels may be identical to the distance between two other consecutive outlet orifices of the plurality of lubrication channels.

Preferably, the distance between the outlet orifices of two consecutive lubrication channels of the plurality of lubrication channels may increase by moving away from the cutting face.

Advantageously, this allows to optimize the lubrication of the cutting area.

Alternatively, the distance between the outlet orifices of two consecutive lubrication channels of the plurality of lubrication channels may increase by moving closer to the cutting face.

The cutting face extends along a first axis, and at least one lubrication channel may extend along a second axis that is different from the first axis. In other words, the lubrication channels can be inclined relative to the cutting face.

In particular, a solid angle between 0° and 90° may extend between the first axis and the second axis. Preferably, the solid angle between the first axis and the second axis may be between 0° and 60°.

Advantageously, this allows an optimization of the lubrication of the cutting area.

The outlet orifices of the plurality of lubrication channels may be aligned.

Similarly, the inlet orifices of the plurality of lubrication channels may be aligned along a third axis, which is different from the first axis.

Advantageously, this enables easier lubrication of the broaching tool. Because the inlet orifices are aligned, there is no need to adjust the placement of the broaching tool to supply lubricant to each inlet orifice.

The number of outlet orifices, the position of the lubrication channels and their inclination depends on the size and the shape of the cutting face.

A lubrication channel may be straight and extend along an axis. Alternatively, a lubrication channel may be shaped like an elbow and comprise at least two straight portions extending along different axes.

A lubrication channel may comprise an inlet orifice arranged to receive the lubricant and a plurality of outlet orifices, each outlet orifice opening into the cavity.

The cross-section of the inlet and outlet orifices of a lubrication channel may be circular, oval, polygonal, or any other shape.

The cross-section of the lubrication channel may be circular, oval, polygonal, or any other shape.

The broaching tool may comprise a plurality of cutting areas, each cutting area comprising a cutting face intended to come into contact with a workpiece so as to remove material from the workpiece, and a plurality of cavities intended to receive the material, one cavity being arranged between two successive cutting areas. The outlet orifices of the lubrication channels intended to be supplied with lubricant can open into each cavity, each lubrication channel having an inlet orifice arranged to receive the lubricant.

The broaching tool according to the disclosure can be carried out by powder metallurgy, for example by sintering.

In the case of a broaching tool machined from solid, the lubrication channels of the broaching tool can be carried out by electrical discharge machining.

The disclosure also relates to a broaching machine characterized in that it comprises:
- a broaching tool according to the disclosure, and
- a lubrication system comprising a lubricant tank and lubrication means configured to deliver the lubricant from the tank to the outlet orifices of the lubrication channels under high pressure.

Advantageously, the lubrication system allows the supply of at least one lubrication channel in order to deliver the lubricant as close as possible to the cutting area of a broaching tool during the broaching.

In addition, the high-pressure assistance allows to make the broaching operation safer and reduces the size of the elements of the broaching tool as well as a reduction of the associated costs.

The lubrication system allows to ensure a sufficient flow rate and a pressure to transfer the lubricant from the tank to the broaching tool. In particular, the lubrication system is configured to deliver the lubricant under high pressure to the outlet orifices located in the cavity.

This lubrication allows to induce a high stress on the material removed from the workpiece, i.e. on a chip, to the vicinity of the cutting face, which causes the chip to bend more. This additional mechanical stress on the chip promotes its fragmentation, i.e. the chip will be smaller than a chip generated with a conventional lubrication, as with the broaching tools according to the prior art.

In addition, the fragmentation of the chips, and thus the reduction in their size, allows the size of the cavities, i.e. the chip chambers, to be minimized, which makes the broaching tool more robust. In addition, the risk of large chips getting stuck in the chip chambers and leading to damaging the broaching tool or the workpiece is reduced. This reduction in the size of the chip chamber and therefore the pitch P between two cutting areas induces a reduction in the size of the elements of the broaching tool. This reduction in the length of the broaching tool contributes to a reduction in the machining time and the manufacturing cost of the broaching tool.

In addition, since the friction increases the temperature of the broaching tool, which contributes to accelerate wear, it is important to minimize its effects. The high-pressure lubrication at the interface between the chip and the broaching tool allows to reduce the frictional surface, encouraging the chip to bend. The reduction of the friction surface leads to a reduction in the amount of heat generated on the broaching tool, and thus to an increase in its service life.

The lubrication system allows the lubricant to be delivered under high pressure, i.e. at a pressure of between 10 and 300 bar.

The broaching machine may also comprise a frame.

The broaching tool can be mobile in translation in relation to the frame. The workpiece can be fixed in translation in relation to the frame. The lubrication system can be fixed in translation relative to the frame.

Alternatively, the broaching tool may be fixed in translation relative to the frame, and the workpiece and the lubrication system may be mobile in translation relative to the frame.

In other words, one of the broaching tool and the workpiece is mobile in translation relative to the frame, the other of the broaching tool and the workpiece is fixed in translation relative to the frame, and the lubrication system is fixed in translation relative to the workpiece. Thus, the broaching tool and the workpiece are moved in translation relative to each other.

The lubrication means may comprise a lubrication distributor configured to supply lubricant under high pressure to the lubrication channels of at least one or each cavity corresponding to a cutting area, a cutting face of which comes into contact with the workpiece.

During the broaching, the lubrication distributor allows the selective supply of at least one lubrication channel to deliver the lubricant as close as possible to the cutting area of a broaching tool.

The interface between the lubrication system and the broaching tool thus allows lubricant to be supplied only to the lubrication channels located at the level of the cavities opposite the cutting faces that are engaged or about to engage in the material of the workpiece. This is because the lubrication distributor allows only to supply the lubrication channels opposite the cutting faces that are engaged or about to engage in the material of the workpiece.

The lubrication distributor, which is fixed in relation to the workpiece to be broached, allows the lubrication channels of the various cavities of the broaching tool to be supplied when the cavities reach its level, at the moment of engaging in the workpiece.

The size of the lubrication distributor allows the supply of the lubrication channels to be stopped as soon as the relevant cavity is no longer in the workpiece. This lubrication distributor is specific to each thickness of the workpiece to be broached so that only the necessary lubrication channels are supplied.

The lubrication distributor may comprise at least one seal.

Advantageously, the seal integral with the lubrication distributor allows to ensure the sealing of the interface with the broaching tool.

The disclosure also relates to a method for machining a workpiece by means of a broaching machine according to the disclosure, the broaching machine comprising a frame, the method comprising the steps of:

translating one of the broaching tool and the workpiece relative to the frame so that at least one cutting face comes into contact with the workpiece, the other of the broaching tool and the workpiece being fixed relative to the frame, lubricating the at least one cavity corresponding to the cutting area for which the cutting face comes into contact with the workpiece, by means of the lubrication system, which is fixed with respect to the workpiece, and stopping the lubrication of the at least one cavity corresponding to the cutting area as soon as the cutting face ceases to be in contact with the workpiece.

Advantageously, this method allows a selective lubrication of the cavities of the broaching tool.

The lubrication can be carried out by means of a liquid lubricant, such as a whole oil, or an emulsion.

DESCRIPTION OF THE DRAWINGS

The disclosure will be better understood and other details, characteristics and advantages of the present disclosure will become clearer from the following description made by way of non-limiting example and with reference to the attached drawings, in which.

The elements having the same functions in the different implementations have the same references in the figures.

DETAILED DESCRIPTION

Figure 3:
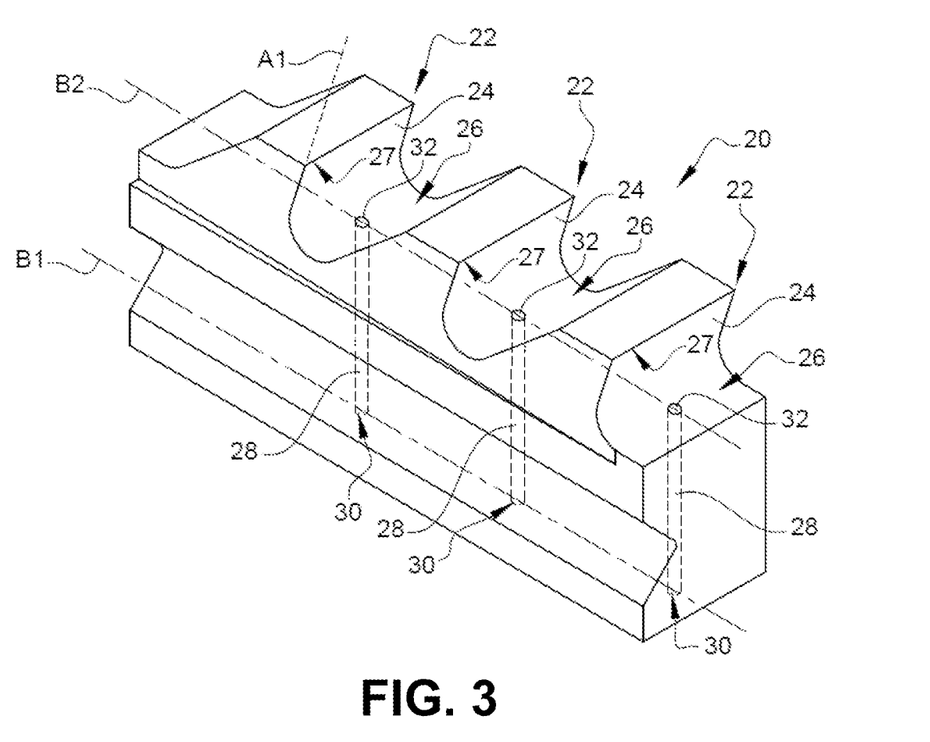
FIG. 3 is a perspective view of a broaching tool according to the disclosure.
Figure 4:
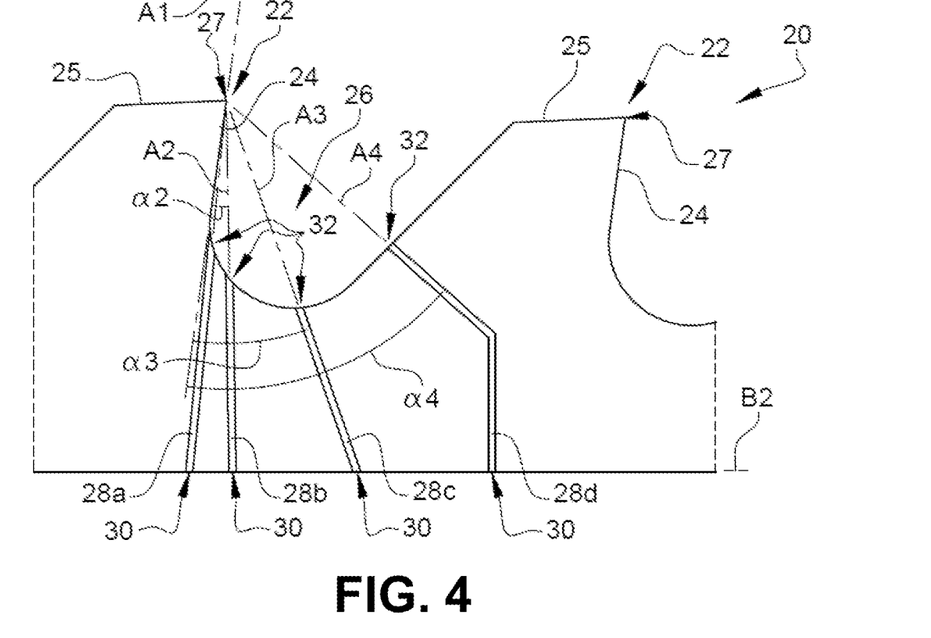
FIG. 4 is a cross-sectional view of a broaching tool according to the disclosure.

FIGS. 3 and 4 show a broaching tool 20 according to the disclosure.

The broaching tool 20 comprises a plurality of cutting areas 22, in this case three cutting areas. Each cutting area 22 comprises a cutting face 24 intended to come into contact with a workpiece to be broached so as to remove material, in the form of at least one chip, from the workpiece. The cutting face 24 is a surface of the cutting area 22, between an undercut area 25, also called an undercut face, and a cavity 26. A cutting face 24 may be a surface of any shape, or a flat surface as in FIGS. 3 and 4.

Similarly, an undercut face 25 may be a surface of any shape, or a flat surface as in FIGS. 3 and 4.

A cutting edge 27 is defined as an intersection between a cutting face 24 and an undercut area 25.

In FIG. 4, the cutting faces 24 are not staged. Although not shown, the cutting faces 24 may be staged.

The broaching tool 20 comprises a plurality of cavities 26, each cavity 26 corresponding to a cutting area 22. A cavity 26 is arranged so as to receive the material that a cutting face 24a removes from the workpiece to be broached. Thus, a cavity is associated with a cutting face 24, and thus with a cutting area 22. A cavity is arranged between two consecutive cutting areas 22. In a cross-sectional view, for example as shown in FIG. 4, a cavity 26 has a general "U" shape. Of course, the cavity may have any other cross-sectional shape, such as a general "V" shape or any other shape.

The broaching tool 20 also comprises a plurality of lubrication channels 28 intended to be supplied with lubricant, each lubrication channel 28 having an inlet orifice 30 arranged to receive lubricant and an outlet orifice 32 opening into a cavity 26.

In FIG. 3, there is one lubrication channel 28 per cavity 26. However, the broaching tool 20 may comprise a plurality of lubrication channels 28 per cavity 26. In particular, the broaching tool 20 may comprise between one and thirty lubrication channels 28 per cavity 26. In FIG. 4, there are four lubrication channels 28a, 28b, 28c, 28d for the cavity 26.

Although not shown, a lubrication channel 28 may comprise a single inlet orifice 30 and a plurality of outlet orifices 32, each outlet orifice 32 opening into a cavity 26. In other words, a lubrication channel 28 may be divided into sub-lubrication channels, each sub-lubrication channel having an outlet orifice 32 opening into a cavity 26.

As shown in FIG. 4, the outlet orifices 32 of the lubrication channels 28 are distributed over the surface of a cavity 26.

In particular, the outlet orifices 32 of the lubrication channels 28 may be evenly distributed over the surface of the cavity.

Alternatively, the distance between the outlet orifices 32 of two consecutive lubrication channels 28 may vary by moving away from the cutting face 24. As shown in FIG. 4, the distance between the outlet orifices 32 of two consecutive lubrication channels 28 may increase by moving away from the cutting face 24. Indeed, the distance between the orifice 32 of the lubrication channel 28a and the orifice 32 of the lubrication channel 28b is smaller than the distance between the orifice 32 of the lubrication channel 28b and the orifice 32 of the lubrication channel 28c. Similarly, the distance between the orifice 32 of the lubrication channel 28c and the orifice 32 of the lubrication channel 28d is greater than the distance between the orifice 32 of the lubrication channel 28b and the orifice 32 of the lubrication channel 28c. Thus, the spacing between two outlet orifices 32 of two consecutive lubrication channels 28 decreases by moving closer to the cutting face 24.

Alternatively, although not shown, the distance between the outlet orifices 32 of two consecutive lubrication channels 28 may increase as one moves closer to the cutting face 24. Thus, the spacing between two outlet orifices 32 of two consecutive lubrication channels 28 decreases by moving away from the cutting face 24.

The distance between the inlet orifices 30 of the lubrication channels 28 may be identical. Alternatively, the distance between the inlet orifices 30 of the consecutive lubrication channels 28 may vary.

The cutting face 24 extends along an axis, noted A1 in FIG. 4. At least one lubrication channel 28 may extend along another axis, which is different from the axis A1. As shown in FIG. 4, in the plane (A1, B2), the lubrication channel 28a extends substantially along the axis A1, the lubrication channel 28b extends along an axis A2 that forms an angle $\alpha 2$ with the axis A1, the lubrication channel 28c extends along an axis A3 that forms an angle $\alpha 3$ with the axis A1, and the lubrication channel 28d extends along an axis A4 that forms an angle $\alpha 4$ with the axis A1. In the plane (A1, B2), the angles $\alpha 1$, $\alpha 2$ and $\alpha 3$ may be between 0° and 90°, and preferably between 0° and 60°.

The lubrication channels may extend along axes not included in the plane (A1, B2), for example in a plane defined by an axis parallel to the axis A1 and an axis parallel to the axis B2 and define solid angles in these planes. The solid angles $\alpha 1$, $\alpha 2$ and $\alpha 3$ can be between 0° and 90°. Preferably, the solid angles $\alpha 1$, $\alpha 2$ and $\alpha 3$ are between 0° and 60°.

As shown in FIG. 3, the inlet orifices 30 of the lubrication channels 28 may be aligned.

For example, the inlet orifices 30 may be aligned in the direction of elongation of the broaching tool 20, represented by the axis B1 in FIG. 3.

Similarly, the outlet orifices 32 of the lubrication channels 28 may be aligned. For example, the outlet orifices 32 may be aligned in the direction of elongation of the broaching tool 20, represented by the axis B2 in FIG. 3.

A lubrication channel 28 may be straight and extend along an axis. For example, the lubrication channels 28a, 28b and 28c are straight and extend along the axes A1, A2 and A3 respectively.

Alternatively, a lubrication channel 28 may have an elbow shape and comprise straight portions. For example, the lubrication channel 28d has an elbow shape, and comprises two straight portions, the second straight portion extending along the axis A4.

The length of a lubrication channel 28, i.e. the longitudinal size of a lubrication channel, may be different from the length of another lubrication channel 28. For example, in FIG. 4, the lubrication channels 28a, 28b, 28c, 28d have different lengths. These differences in the length of the lubrication channels result in differences in the height of the outlet orifices 32. Thus, the outlet orifices 32 may not be aligned along an axis orthogonal to the direction of elongation of the broaching tool 20.

The cross-section of a lubrication channel 28 may be circular, oval, polygonal, or any shape.

The cross-section of an inlet orifice 30 of a lubrication channel 28 may be circular, as shown in FIG. 3, or oval, or polygonal, or any shape. Similarly, the cross-section of an outlet orifice 32 of a lubrication channel 28 may be circular, as in FIG. 3, or oval, or polygonal, or any shape.

In particular, the number of outlet orifices 32, the position of the lubrication channels 28 on the cavity 26, as well as their inclination relative to the axis A1 of the cutting edge 24 depends on the size and the shape of the cutting edge 24.

Figure 5:
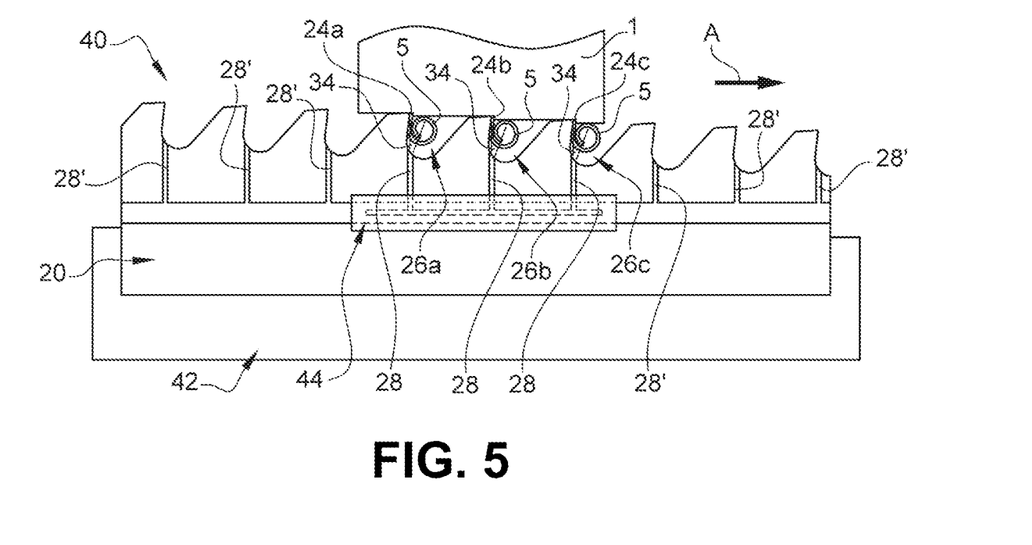
FIG. 5 is a cross-sectional view of a broaching machine according to the disclosure.
Figure 6:
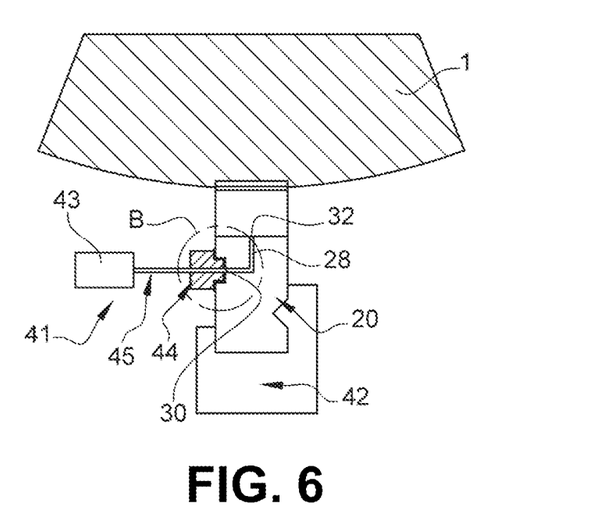
FIG. 6 is a cross-sectional view of the broaching machine of FIG. 5.
Figure 7:
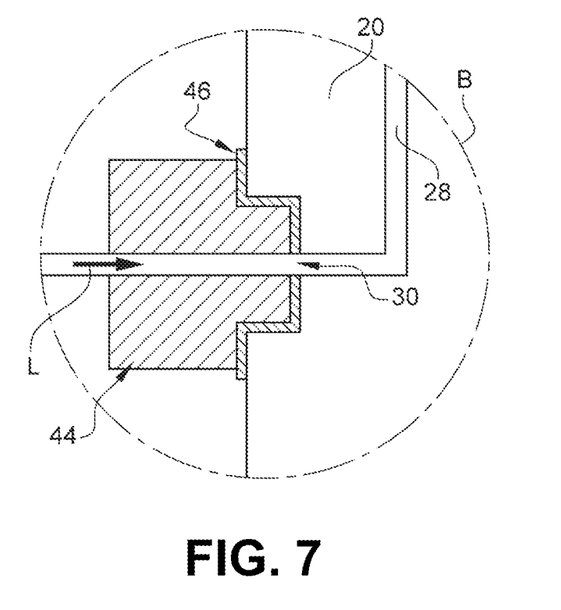
FIG. 7 shows an enlarged view of the box B in FIG. 6.

FIGS. 5 to 7 show a broaching machine according to the disclosure.

The broaching machine 40 comprises a frame. The workpiece 1 to be broached can be arranged fixed relative to the frame. Alternatively, the workpiece to be broached can be arranged mobile in translation relative to the frame.

The broaching machine 40 also comprises the broaching tool 20, which may be arranged mobile in translation relative to the frame, the translation movement of the broaching tool 20 being represented by the arrow A. The broaching tool 20 may be arranged on a slider 42, which is mobile in translation relative to the frame. Alternatively, the broaching tool 20 may be fixed relative to the frame.

The broaching machine 40 also comprises a lubrication system 41, which is fixed in translation with respect to the workpiece. The lubrication system 41 comprises a tank 43 of lubricant and lubrication means 45 configured to deliver the lubricant from the tank 43 to at least one outlet orifice 32 of a lubrication channel 28 under high pressure. The lubrication system 41 allows the lubricant to be delivered at a pressure of between 10 and 300 bar.

The lubrication means 45 may comprise a lubrication distributor 44 configured to supply lubricant under high pressure to the or each lubrication channel 28 of one or of each cavity 26 corresponding to a cutting area 22 having a cutting edge 24 in contact with the workpiece 1. In particular, the lubrication distributor 44 supplies lubricant only to the lubrication channels 28 of the cavities 26 corresponding to the cutting areas 22 whose cutting edges 24 are in contact with the workpiece 1 or are about to come into contact with the workpiece 1. In other words, the lubrication distributor 44 supplies lubricant only to the lubrication channels 28 for which the cavities 26 correspond to the cutting edges 24 engaged or about to engage in the workpiece 1. For example, in FIG. 5, three cutting edges 24a, 24b, 24c are in contact with the workpiece 1 so as to form a chip 5, the corresponding cavities 26a, 26b, 26c are then lubricated through the lubrication channels 28'. The lubrication of the cutting areas is shown by the dotted line 34. The lubrication channels 28 in FIG. 5 are not supplied with lubricant. Thus, the supply to the lubrication channels 28' ceases as soon as the cutting edge 24 to which a cavity 26 corresponds is no longer in the workpiece 1.

Thus, during the broaching, the lubrication distributor 44 allows the selective supply of the lubrication channels 28, 28' to deliver the lubricant from the tank 43 at the level of the cutting area of a broaching tool 20.

The lubrication distributor 44 may comprise one or a plurality of seals 46 allowing to ensure the sealing of the interface of the lubrication distributor 44 with the broaching tool 20. In FIGS. 6 and 7, a lubrication channel 28, shown in dotted line in FIG. 6, is supplied with lubricant from the tank 43, with the arrow L in FIG. 7 representing the supply of lubricant through the lubrication distributor 44.

A method for machining a workpiece 1 by means of a broaching machine 40 as previously described comprises a step of translating one of the broaching tool 20 and the workpiece 1 relative to the frame, the other of the broaching tool 20 and the workpiece 1 being fixed relative to the frame, so that at least one cutting edge 24a, 24b, 24c comes into contact with the workpiece 1.

The method also comprises a step of lubricating the or each cavity 26 corresponding to a cutting area where the cutting edge 24a, 24b, 24c enters into contact with the workpiece 1, by means of the lubrication system 41.

The method also comprises a step of stopping the lubrication of the or each cavity corresponding to the cutting area as soon as the cutting edge 24a, 24b, 24c ceases to be in contact with the workpiece 1.

In particular, the lubrication can be carried out by means of a liquid lubricant, such as a whole oil, or an emulsion.

The size of the lubrication distributor 44 are based on the size of the workpiece 1 to be broached, so that lubrication is carried out only for the cutting areas 22 whose cutting edges 24 are in contact with the workpiece 1.

The invention claimed is:

1. A broaching tool, comprising:
    at least one cutting area comprising a cutting face configured to come into contact with a workpiece to remove material, in the shape of at least one chip, from said workpiece,
    at least one cavity corresponding to said cutting area, said cavity being arranged to receive said at least one chip,
    at least three lubrication channels associated with the or each cavity and configured to be supplied with lubricant, each lubrication channel having an inlet orifice arranged to receive the lubricant and at least one outlet orifice opening into said cavity, wherein a distance between the outlet orifices of two consecutive lubrication channels of the at least three lubrication channels increases by moving away from the cutting face.

2. The broaching tool according to claim 1, wherein the lubrication channels are inclined relative to the cutting face.

3. The broaching tool according to claim 1, wherein the inlet orifices are aligned.

4. The broaching tool according to claim 1, further comprising a plurality of cutting areas, each cutting area comprising a cutting face configured to come into contact with the workpiece to remove material from said workpiece, and a plurality of cavities configured to receive said material, one cavity being arranged between two successive cutting areas, and wherein, in each cavity open out the outlet orifices of the lubrication channels configured to be supplied with lubricant, each lubrication channel having an inlet orifice arranged to receive the lubricant.

5. A broaching machine, comprising:
    the broaching tool according to claim 4,
    a lubrication system comprising a lubricant tank and lubrication means configured to deliver lubricant from said tank to the outlet orifices of the lubrication channels under high pressure of between 10 and 300 bar, and
    a frame, the broaching tool being mobile in translation relative to the frame, the lubrication system being fixed in translation relative to the frame and in which the lubrication means comprise a lubrication distributor configured to supply lubricant under high pressure to the lubrication channels of at least one or of each cavity corresponding to a cutting area, a cutting face of which comes into contact with the workpiece.

6. The broaching machine according to claim 5, wherein the lubrication distributor comprises at least one seal.

7. A broaching machine, comprising:
    the broaching tool according to claim 4,
    a lubrication system comprising a lubricant tank and lubrication means configured to deliver lubricant from said tank to the outlet orifices of the lubrication channels under high pressure of between 10 and 300 bar, and
    a frame, the broaching tool being fixed in translation relative to the frame, the lubrication system being mobile in translation relative to the frame and in which the lubrication means comprise a lubrication distributor configured to supply lubricant under high pressure to the lubrication channels of at least one or of each cavity corresponding to a cutting area, a cutting face of which comes into contact with the workpiece.

8. The broaching machine according to claim 7, wherein the lubrication distributor comprises at least one seal.

9. A broaching machine, comprising:
    the broaching tool according to claim 1, and
    a lubrication system comprising a lubricant tank and lubrication means configured to deliver lubricant from said tank to the outlet orifices of the lubrication channels under high pressure of between 10 and 300 bar.

10. A method for machining a workpiece by means of a broaching machine according to claim 9, the broaching machine comprising a frame, one of the broaching tool and said workpiece being fixed relative to the frame, the method comprising the steps of:

translating the other of the broaching tool and the workpiece relative to the frame so that at least one cutting face comes into contact with the workpiece, lubricating, by means of the lubrication system, the at least one cavity corresponding to the cutting area for which the cutting face comes into contact with the workpiece, stopping the lubrication of the at least one cavity corresponding to said cutting area as soon as the cutting face ceases to be in contact with the workpiece.

\* \* \* \* \*